United States Patent
Clark et al.

(10) Patent No.: US 8,809,698 B2
(45) Date of Patent: Aug. 19, 2014

(54) HOUSING-CAPTURED COMPONENT CARRIER FOR REDUCING FASTENERS

(75) Inventors: John S. Clark, South Milwaukee, WI (US); Mark E. Innes, Ashville, NC (US); Michael G. Early, Canton, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 439 days.

(21) Appl. No.: 13/295,828

(22) Filed: Nov. 14, 2011

(65) Prior Publication Data

US 2013/0118797 A1   May 16, 2013

(51) Int. Cl.
 *H05K 5/00*  (2006.01)
(52) U.S. Cl.
 USPC .......... 174/535; 174/520; 361/726; 361/727; 361/731
(58) Field of Classification Search
 CPC .......... H02B 1/04; H02B 1/012; H02B 1/048; H02B 1/052; H02B 1/0565; H02B 1/06; H02B 1/46; H02B 1/48
 USPC ............ 174/50, 61, 520, 535, 559, 560, 561, 174/563, 565; 361/621, 629, 631, 627, 633, 361/644, 647, 657, 726–732, 747, 759, 361/801–802
 See application file for complete search history.

(56) References Cited

U.S. PATENT DOCUMENTS

| | | | | |
|---|---|---|---|---|
| 3,772,573 A | * | 11/1973 | Triplett et al. | 361/679.01 |
| 4,351,620 A | * | 9/1982 | Stritt et al. | 403/13 |
| 5,640,294 A | * | 6/1997 | Caggiano et al. | 361/637 |
| 6,180,897 B1 | * | 1/2001 | Montague et al. | 200/50.35 |
| 6,252,165 B1 | * | 6/2001 | Montague et al. | 174/50 |
| 6,416,702 B1 | * | 7/2002 | Montague et al. | 264/250 |
| 7,286,340 B2 | * | 10/2007 | Karim et al. | 361/647 |
| 7,813,110 B1 | * | 10/2010 | Rezac | 361/624 |
| 8,270,167 B2 | * | 9/2012 | Greenwood et al. | 361/704 |
| 8,395,885 B2 | * | 3/2013 | Maloney | 361/656 |

* cited by examiner

*Primary Examiner* — Hoa C Nguyen
*Assistant Examiner* — Amol Patel
(74) *Attorney, Agent, or Firm* — Boyle Fredrickson, S.C.

(57) ABSTRACT

An electrical control module provides a plastic insert fitting inside a housing and compressed by assembly of the housing lid and base to be held securely therein. Elastic components on the plastic insert are compressed during the assembly provide a secure retention in the face of normal manufacturing tolerances. The plastic insert includes features for attaching electrical components such as electrical contactors, motor starters, disconnect switches, circuit breakers, and overload switches without conventional screw fasteners or the like through channels and elastic detents.

19 Claims, 3 Drawing Sheets

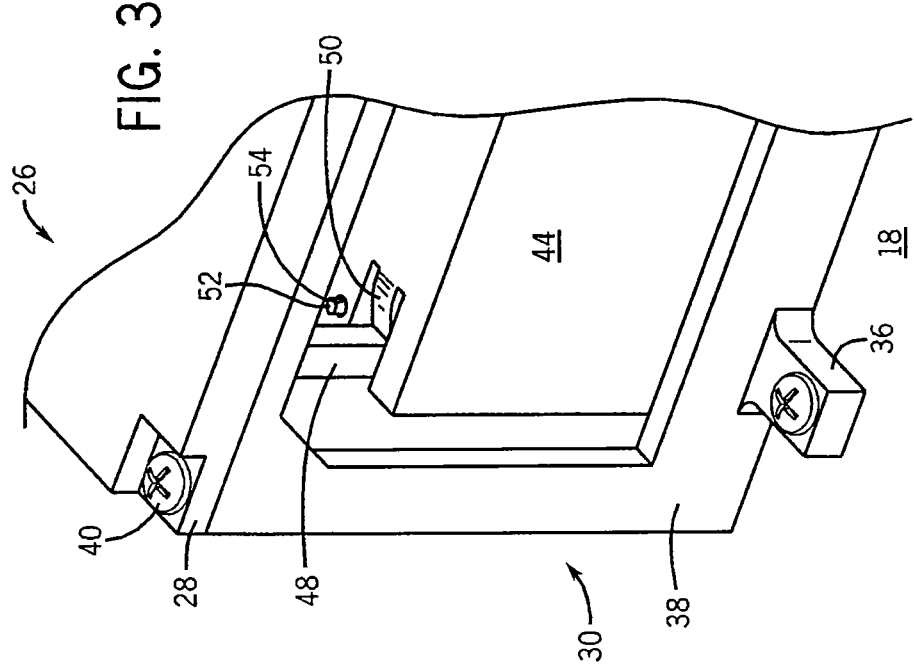
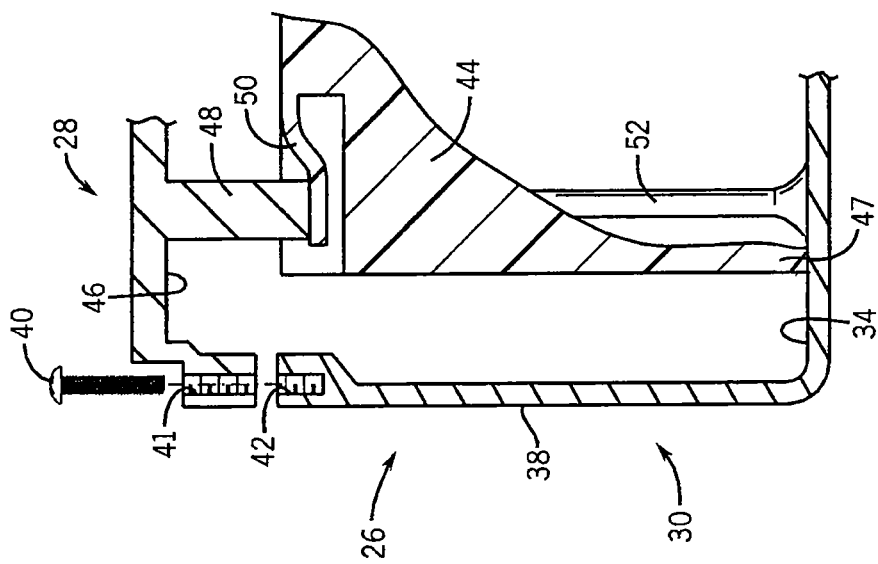

HOUSING-CAPTURED COMPONENT CARRIER FOR REDUCING FASTENERS

FIELD OF THE INVENTION

The present invention relates to electrical control modules, for example, as used for motor control, and in particular to a method of assembling electrical components into such modules with reduced fastener use.

BACKGROUND OF THE INVENTION

Electrically powered equipment in a factory, such as conveyors or the like, may employ electrical control modules placed between electrical power lines and electrical motors used in such devices. Such electrical control modules may incorporate in a single housing multiple electrical components including, for example, power disconnects, circuit breakers, overload relays, motor starters, drives, terminal strips and the like. These electrical components are wired together to provide an integrated system controlling and protecting the motor and equipment operators.

Electrical control modules of this kind may be assembled on a customized basis for particular motor sizes and then shipped to the factory site to be connected to other components and wired to the electrically powered equipment which they control.

Assembling together the electrical components of an electrical control module is normally accomplished by attaching each electrical component to a mounting plate using machine screws passing through holes in flanges of the electrical components and corresponding holes in the mounting plate to be retained by nuts and lock washers. The mounting plate may be predrilled and attached through standoffs or other means to the housing to provide a strong physical connection between the housing and the various electrical components. This method of attaching electrical components together within an electrical control module is physically robust and flexible accommodating many different types of electrical components through the provision of multiple holes in a mounting plate.

SUMMARY OF THE INVENTION

The present have recognized that a significant cost to the assembly of electrical control modules relates to the management and installation of multiple machine screw fasteners, lock washers, and nuts used to attach the electrical components. Accordingly, the present invention provides a polymeric insert that may be used to physically assemble electrical components together in a module and with reduced or no separate fasteners and to affix the polymeric insert firmly within the module housing relying on the fasteners used to assemble the housing without the need for separate fasteners to assemble the insert to the housing.

Specifically, the present invention provides electrical control module having a housing defining a contained volume held between an interfitting housing base and a housing lid, the housing base providing a first inwardly facing support surface surrounded by upstanding side walls opposing a second inwardly facing support surface on the housing lid when the housing base and housing lid are inter fitting, the housing lid interfitting against upper edges of the upstanding side walls to be retained there by attachment elements. A polymeric insert is within the contained volume and provides mounting surfaces for electrical components selected from the group consisting of electrical contactors, motor starters, disconnect switches, circuit breakers, and overload switches. The polymeric insert includes multiple elastomeric elements and the housing base and housing lid have inwardly extending compression surfaces engaging the elastomeric elements when the housing base and housing lid are interfitting to compress the same and secure the polymeric insert within the housing.

It is thus a feature of at least one embodiment of the invention to largely eliminate the need for time-consuming assembly of the electrical components to a mounting plate using multiple fasteners. It is a further feature of at least one embodiment of the invention to avoid the need for time-consuming assembly of the mounting plate to the housing of the electrical module.

The elastomeric elements may be cantilevered polymeric beams deflected by the compression surfaces.

It is thus a feature of at least one embodiment of the invention to employ structure of the polymeric insert itself as the elastomeric elements.

The compression surfaces may be posts protruding from one of the inwardly facing surfaces.

It is thus a feature of at least one embodiment of the invention to permit the elastic elements to be closely located to the structure supported by the polymeric insert for improved rigidity.

The polymeric insert may further include guide surfaces engaging portions of a least one of the housing lid and housing base to position the polymeric insert in a predetermined location along the first inwardly facing surface between the upstanding side walls It is thus a feature of at least one embodiment of the invention to implement not only the compressive features of threaded fasteners but their location features as well to prevent lateral motion (perpendicular to the compressive force) of the electrical components within the housing.

The guide surfaces may be pins received by corresponding holes in the polymeric insert.

It is thus a feature of at least one embodiment of the invention to permit the points of engagement between the guide surfaces and the polymeric insert to be close to the elements supported by the polymeric insert for increased rigidity.

The pens may include a key portion fitting in a corresponding hole within the polymeric insert and a ledge portion fitting against a lower face of the polymeric insert.

It is thus a feature of at least one embodiment of the invention to provide both support and lateral location with simply constructed guide surfaces The polymeric insert may include a lower edge defining a plane fitting against the first inwardly facing surface.

It is thus a feature of at least one embodiment of the invention to permit portions of the polymeric insert to be broadly supported by the housing components for improved rigidity.

The mounting surfaces of the polymeric insert may include opposed channel elements for slidably receiving a corresponding flange surface on the electrical components.

It is thus a feature of at least one embodiment of the invention to provide a simple method of robustly attaching multiple types of electrical components to the polymeric insert using features well implemented in polymer.

The opposed channels may conform to the dimensions of a standard DIN rail.

It is thus a feature of at least one embodiment of the invention to provide an attachment method that works with a wide variety of different electrical components manufactured for DIN rail mounting.

The mounting surfaces further include a spring detents for capturing the electrical component once its flange surface is received within the opposed channel elements.

It is thus a feature of at least one embodiment of the invention to provide a fastener less method of releasably retaining the electrical components in the respective channels.

The spring detents may be cantilevered polymeric beams having upwardly extending hooks.

It is thus a feature of at least one embodiment of the invention to implement the attachment mechanisms for the electrical components entirely through features molded into the polymeric insert.

The mounting surfaces may include at least two spring detents at different locations on the mounting surface along an axis of insertion of the electrical component into the opposed channels to block advance of the electrical component into the opposed channels in a given direction.

It is thus a feature of at least one embodiment of the invention to permit different electrical components having different axial dimensions to be used with the given polymeric insert.

The housing may include tabs projecting laterally for attachment of the housing to a planar surface.

It is thus a feature of at least one embodiment of the invention to provide a simple method of attaching the electrical module to associated equipment or the like.

The housing may be metal.

It is thus a feature of at least one embodiment of the invention to permit the polymeric insert to derive greater strength by intimate contact with a relatively rigid metallic housing.

The housing base and housing lid may be assembled together using machine screws.

It is thus a feature of at least one, embodiment of the invention to provide an attachment mechanism of the housing lid and base conducive to compressing the polymeric insert therein. The machine screws provide substantial mechanical advantage for an arbitrary amount of compressive force.

Other features and advantages of the invention will become apparent to those skilled in the art upon review of the following detailed description, claims and drawings in which like numerals are used to designate like features.

BRIEF DESCRIPTION OF THE DRAWINGS

FIG. 2 is a fragmentary cross-section through the control module of FIG. 1 showing retention of an internal polymeric insert through flexing cantilevered elements;

FIG. 3 is a fragmentary perspective view of the assembled housing and polymeric insert showing a guide pin aligning the polymeric insert within the housing.

DETAILED DESCRIPTION OF THE PREFERRED EMBODIMENT

Figure 1:
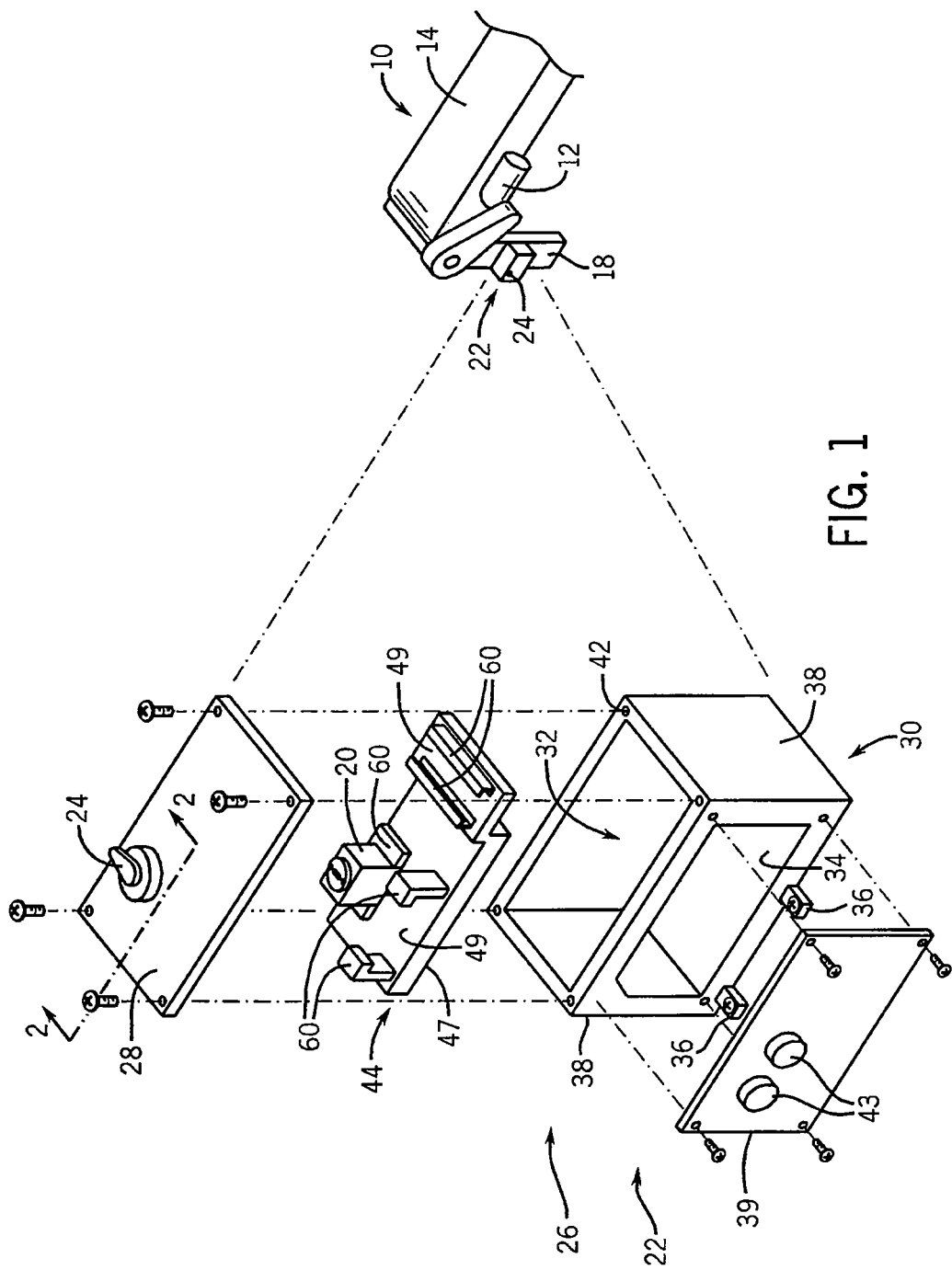
FIG. 1 is a perspective view of a motorized conveyor suitable for use with the present invention indicating a mounting of an electronic control module there on and showing an exploded diagram of the housing of the control module incorporating polymeric insert onto which electrical components may be mounted.

Referring now to FIG. 1, a motorized conveyor system 10, representative of one type of electrically powered industrial equipment, may provide an electrical motor 12 powering a movable conveyor belt 14. The motorized conveyor system 10 may provide a mounting surface 18, (for example a leg of the conveyer) on which an electrical control module 22 may be attached and interconnected by wiring (not shown) to the electrical motor 12 and a source of line power. The electrical control module 22 may include a switch operator 24 or the like projecting from a front face of the electrical control module 22 to allow control of electrical power applied to the motor 12 by a nearby individual.

Referring still to FIG. 1, the electrical control module 22 may collect electrical components 20 in a protective metal housing 26. The electrical components 20 (a single disconnect module shown) may be preassembled to implement a desired function, for example power conditioning for motor 12, including providing for disconnection of electrical power to the motor 12, overvoltage and overcurrent protection of the motor 12, and proper motor startup voltages, for example. The electrical components 20 may include: power disconnects, circuit breakers, overload relays, motor starters, drives, terminal strips, and the like.

The housing 26 of the module 22 may be constructed of separable components including a housing lid 28 attachable to a housing base 30 to define a housing volume 32 therein. The housing lid 28 may include a movable switch operator 24 supported thereby and having a shaft (not shown) passing through the lid 28 to communicate with an internal electrical component 20, in this case, an electrical disconnect module.

The housing base 30 may present a first inner, upwardly facing, and generally planar, support surface 34 whose opposite side may be mounted against the mounting surface 18 by means of outwardly extending tabs 36 attachable to the mounting surface 18 by machine screws or the like. Surrounding the planar support surface 34 are upwardly extending side walls 38 whose upper edges form a continuous periphery that may be capped by a generally planar housing lid 28 attached to that periphery by means of multiple machine screws 40 passing through holes 41 in the corners of the lid 28 and into corresponding threaded bores 42 in the corners of the upper edges of the upstanding side walls 38.

One or more of the upwardly extending side walls 38 may have openings receiving customization plates 39, for example, being electrical plates holding electrical connectors 43 or the like for communication with the electrical wiring within the housing 26. The customization plates 39 and attached connectors 43 may be varied according to the particular application of the electrical control module 22.

Fitting within the housing volume 32 is a polymeric insert 44. The polymeric insert 44 may have a lower edge 47 defining a surface that may abut the planar support surface 34 and upper mounting surfaces 49 for receiving electrical components 20 thereagainst as will be described. The polymeric insert 44 may be injection molded thermoplastic providing for good electrical insulation, low cold flow, and good elasticity.

Referring now to FIG. 2, the underside of the lid 28 may provide a second inwardly facing support surface 46 opposite the support surface 34 when the lid 28 is attached to the housing base 30. The support surface 46 may include one or more downwardly extending compression surfaces 48 which engage corresponding cantilevered spring element 50 when the lid 28 is attached to the housing base 30. When the lid 28 is attached to the housing base 30, the polymeric cantilevered spring element 50 presses upward against the downwardly extending compression surfaces 48 holding the polymeric insert 44 between the compression surfaces 48 and the interface between the support surface 34 on the lower edge 47 of the polymeric insert 44.

The spring element 50 makes use of the natural resilience of the polymeric material of the polymeric insert 44 to deflect elastically downward under compression by the extending compression surface 48 with assembly of the lid 28 to the housing base 30 so as to ensure vibration less retention of the insert polymeric insert 44 within the housing 26 while accepting reasonable manufacturing tolerances which may change the dimensions of the extension of the compression surfaces 48 or the size of the polymeric insert 44 or the separation between support surfaces 46 and 34. Thus, the spring elements 50 provide a predetermined compressive force between the housing 26 and the polymeric insert 44 for a range of dimensional variations. It will be appreciated that the spring elements 50 formed from a polymeric material will have a high intrinsic level of dampening so as to help not only retain the components but to reduce vibration by dissipating the energy.

Referring to FIGS. 2 and 3, the support surface 34 of the housing base 30 may include upwardly extending guide surfaces 52 provided by a pin or other feature engaging a corresponding notch 54 or like in the polymeric insert 44. These guide surfaces 52 serve to laterally align the polymeric insert 44 within the housing 26 against vibration or lateral movement with respect to the side walls 38 and further ensure correct insertion into the housing 26.

Figure 4:
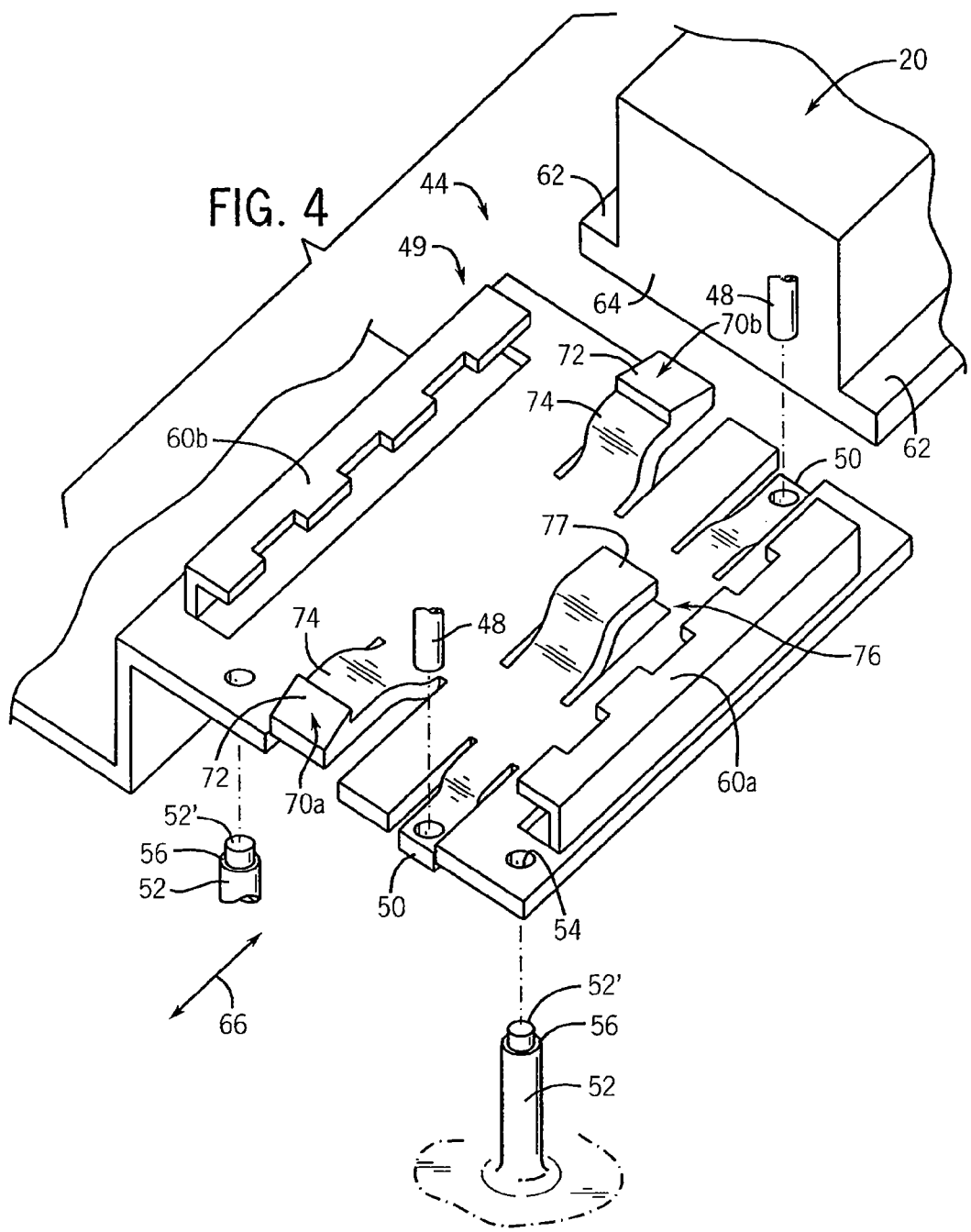
FIG. 4 is a detailed fragmentary perspective view of a mounting surface of the polymeric insert for receiving an electrical component between opposed flanges has retained by flexing detents.

Referring now to FIG. 4, the guide surfaces 52 may in some embodiments provide upwardly facing ledges 56 that can support the underside of the polymeric insert 44 instead of the support surfaces of the lower edge 47 to resist vertical movement. In this case, the guide surfaces 52 include a smaller diameter extension 52' fitting within a hole or notch 54 to resist lateral movement.

As noted, the mounting surfaces 49 of the polymeric insert 44 may include features intended for fastener-less attachment of electrical components 20 to the mounting surfaces 49. In one embodiment, these features may include spaced parallel channels 60a and 60b extending upward from the mounting surface 49 and providing mutually opposed channel slots separated to receive flanges 62 extending in opposite directions from a base 64 of the electrical component 20. In this way, the electrical component 20 may slide into the channels 60 along an axis 66 to be retained by the channels 60 against motion perpendicular to that axis 66. The channels 60 may be preferably molded into the polymeric insert 44.

Detent elements 70a and 70b may be positioned at the edges of the mounting surface 49 along axis 66 and have upwardly extending hooks 72 mounted on cantilevered tabs 74 to project in a relaxed state above the upper plane of the mounting surface 49. The tabs 74 of polymeric material (preferably formed integrally with the polymeric insert 44) may flex downward to allow passage of the base 64 over the hook 72 as the electrical component 20 is slid into engagement in the channels 60, but then may spring upward to catch the vertical edge of an end of the component 20 against further axial movement once the hook 72 clears the base 64. The use of two opposed upwardly extending hooks 72 on different separated cantilevered tabs 74 may block axial movement in either direction. In this way, electrical component 20 may be assembled to the mounting surface 49 and retained there without the need for screw fasteners or the like.

It will be understood that the component 20 may be removed from the mounting surface 49 by reversing the above procedure and one of the hooks 72, for example, with the blade of the screwdriver, to allow the base 64 to pass thereover. The use of two detent elements 70a and 70b arranged as mirror images, allow insertion or removal of electrical component 20 from the mounting surface 49 in either direction along axis 66.

The polymeric insert 44 may provide for multiple mounting surfaces 49 for a variety of components allowing selective insertion or installation of those components 20 into the module 22 for semicustom assembly of different components.

The mounting surface 49 may further include one or more intermediate stops 76 which may also be cantilevered beams deformed upward to present a stop surface 77 for components 20 having relatively short length along axis 66 so that these components may be retained between one hook 72 and the stop surface 77. On the other hand, the stop surface 77 may be pressed inward below the plane of the mounting surface 49 so that the channels 60 may receive longer electrical component 20 into the channels 60. In this way, components at different sizes may be admitted into the channels 60.

Multiple spring elements 50 may be distributed around the mounting surfaces 49 in various portions on the polymeric insert 44 to provide in total a high degree of retention force (being the sum of each of the forces on each spring element 50) and to provide more uniformly distributed support of the polymeric insert 44 in the vicinity of the mounted components 20.

The elimination of the need to align and tighten multiple screws with lock washers and nuts and the like greatly simplifies the assembly process.

Incorporation of the guide elements and mounting surfaces into the housing elements of the base and lid eliminates the need for standoffs or other separate components as well saving both assembly time and the need to stock multiple components and the possibility of incorrectly installed components becoming loose in the field.

The polymeric insert provides a generally electrically insulating surface greatly reducing the possibility of ground faults from wires that may become disconnected or abraded and provides a damping quality beyond that obtained from a metal material.

Certain terminology is used herein for purposes of reference only, and thus is not intended to be limiting. For example, terms such as "upper", "lower", "above", and "below" refer to directions in the drawings to which reference is made. Terms such as "left", "right", "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:
1. An electrical control module comprising:
a housing defining a contained volume held between an interfitting housing base and a housing lid, the housing base providing a first inwardly facing support surface surrounded by upstanding side walls opposing a second inwardly facing support surface on the housing lid when the housing base and housing lid are interfitting, the housing lid interfitting against upper edges of the upstanding side walls to be retained there by attachment elements;

a polymeric insert receivable within the contained volume and providing mounting surfaces for electrical components selected from the group consisting of electrical contactors, motor starters, disconnect switches, circuit breakers, and overload switches, the polymeric insert providing multiple elastomeric elements; and wherein at least one of the housing base and housing lid have inwardly extending compression surfaces engaging the elastomeric elements when the housing base and housing lid are interfitting to compress the same and secure the polymeric insert within the housing.

2. The electrical control module of claim 1 wherein the elastomeric elements are cantilevered polymeric beams deflected by the compression surfaces.

3. The electrical control module of claim 1 wherein the compression surfaces are posts protruding from one of the inwardly facing support surfaces.

4. The electrical control module of claim 1 wherein the polymeric insert further includes guide surfaces engaging portions of a least one of the housing lid and housing base to position the polymeric insert in a predetermined location along the first inwardly facing surface between the upstanding side walls.

5. The electrical control module of claim 4 wherein the guide surfaces are pins received by corresponding holes in the polymeric insert.

6. The electrical control module of claim 5 wherein the pins include a key portion fitting in a corresponding hole within the polymeric insert and a ledge portion fitting against a lower face of the polymeric insert.

7. The electrical control module of claim 1 wherein the polymeric insert includes a lower edge defining a plane fitting against the first inwardly facing surface.

8. The electrical control module of claim 1 wherein the mounting surfaces of the polymeric insert include opposed channel elements for slidably receiving a corresponding flange surface on the electrical components.

9. The electrical control module of claim 8 a separation of the opposed channels conform to dimensions of a standard DIN rail.

10. The electrical control module of claim 8 wherein the mounting surfaces further include a spring detents for capturing the electrical component once its flange surface is received within the opposed channel elements.

11. The electrical control module of claim 10 wherein the spring detents are cantilevered polymeric beams having upwardly extending hooks.

12. The electrical control module of claim 8 wherein the mounting surfaces further include at least two spring detents at different locations on the mounting surface along an axis of insertion of the electrical component into the opposed channels to block advance of the electrical component into the opposed channels in a given direction whereby electrical components having different axial length may be accommodated and held.

13. The electrical control module of claim 1 wherein the housing further includes attachment tabs projecting laterally for attachment of the housing to a planar surface.

14. The electrical control module of claim 1 wherein the housing is a metal.

15. The electrical control module of claim 1 wherein the housing base and housing lid are assembled together using machine screws.

16. A method of assembling and electrical control module from multiple electrical components, the electrical control module providing:

a housing defining a contained volume held between an interfitting housing base and a housing lid, the housing base providing a first inwardly facing support surface surrounded by upstanding side walls opposing a second inwardly facing support surface on the housing lid when the housing base and housing lid are interfitting, the housing lid interfitting against upper edges of the upstanding side walls to be retained there by attachment elements; a polymeric insert receivable within the contained volume and providing mounting surfaces for electrical components selected from the group consisting of electrical contactors, motor starters, disconnect switches, circuit breakers, and overload switches, the polymeric insert providing multiple elastomeric elements; wherein at least one of the housing base and housing lid have inwardly extending compression surfaces engaging the elastomeric elements when the housing base and housing lid are interfitting to compress the same and secure the polymeric insert within the housing, the method comprising the steps of:

(a) attaching multiple electrical components to the polymeric insert and interconnecting the same with electrical wiring;

(b) inserting the polymeric insert and the attached multiple electrical components into the housing base;

(c) inter-fitting the housing lid to the housing base so that the compression surfaces engaging the elastomeric elements to secure the polymeric insert within the housing; and (d) secure the housing lid and housing base together by the attachment elements.

17. The method of claim 16 wherein the elastomeric elements are cantilevered polymeric beams deflected by the compression surfaces.

18. The method of claim 16 including the step of mounting the electrical components to the mounting surfaces by sliding flanges of the electrical components into opposed channel elements formed in the polymeric insert.

19. The method of claim 18 wherein the mounting surfaces further include a spring detents flexibly extending upward from the mounting surfaces and including the step of depressing at least one spring detents to insert the electrical components in between the opposed channel elements and then allowing the spring detents to relax upward to retain electrical control component.

* * * * *